United States Patent [19]
Kraft et al.

[11] Patent Number: 5,910,094
[45] Date of Patent: Jun. 8, 1999

[54] AIRCRAFT LABYRINTH FIRE SEAL

[75] Inventors: Kurt R. Kraft, Seattle; Gary L. Vieth; Peter J. Louden, both of Bellevue, all of Wash.

[73] Assignee: The Boeing Company, Seattle, Wash.

[21] Appl. No.: 08/711,276

[22] Filed: Sep. 10, 1996

[51] Int. Cl.⁶ .................................. F02K 3/00; F02C 7/25
[52] U.S. Cl. ...................... 60/39.091; 60/39.31; 277/419
[58] Field of Search ................ 60/39.31, 39.32, 60/39.091, 39.11, 271; 277/359, 417, 419

[56] References Cited

U.S. PATENT DOCUMENTS

| | | | |
|---|---|---|---|
| 1,419,927 | 6/1922 | Hodgkinson | 277/419 |
| 1,626,237 | 4/1927 | Hodgkinson | 244/419 |
| 2,544,538 | 3/1951 | Mahnken et al. | 60/39.32 |
| 2,997,845 | 8/1961 | Oulianoff . | |
| 3,263,931 | 8/1966 | Bartek et al. . | |
| 3,409,228 | 11/1968 | Mehr . | |
| 3,524,588 | 8/1970 | Duval . | |
| 3,550,721 | 12/1970 | Bruner . | |
| 3,583,730 | 6/1971 | Kozlowksi | 285/47 |
| 3,613,826 | 10/1971 | Cabassut . | |
| 3,637,041 | 1/1972 | Hilbig . | |
| 3,647,020 | 3/1972 | MacDonald . | |
| 3,664,455 | 5/1972 | Duvvuri . | |
| 3,695,387 | 10/1972 | Hilbig . | |
| 3,774,868 | 11/1973 | Goetz . | |
| 3,779,006 | 12/1973 | Lewis et al. | 60/39.11 |
| 3,897,169 | 7/1975 | Fowler . | |
| 3,934,889 | 1/1976 | Smith | 277/226 |
| 4,095,417 | 6/1978 | Banthin . | |
| 4,165,609 | 8/1979 | Rudolph . | |
| 4,175,640 | 11/1979 | Birch et al. . | |
| 4,215,536 | 8/1980 | Rudolph . | |
| 4,361,296 | 11/1982 | Hall et al. | 60/39.31 |
| 4,422,524 | 12/1983 | Osborn . | |
| 4,477,088 | 10/1984 | Picard | 277/83 |
| 4,537,026 | 8/1985 | Nightingale . | |
| 4,690,329 | 9/1987 | Madden . | |
| 4,819,876 | 4/1989 | Thayer . | |
| 5,044,559 | 9/1991 | Russell et al. . | |
| 5,154,052 | 10/1992 | Giffin et al. . | |
| 5,156,360 | 10/1992 | Shine | 60/39.31 |
| 5,251,917 | 10/1993 | Chee et al. | 277/228 |
| 5,291,672 | 3/1994 | Brown . | |
| 5,524,846 | 6/1996 | Shine et al. | 60/39.11 |
| 5,524,847 | 6/1996 | Brodell et al. | 60/39.31 |
| 5,690,279 | 11/1997 | Kramer et al. | 239/127.3 |

OTHER PUBLICATIONS

"The Jet Engine", chapters 6, 14, 15 and 19, Rolls–Royce plc, 1992.

*Primary Examiner*—Charles G. Freay
*Assistant Examiner*—Ted Kim
*Attorney, Agent, or Firm*—Christensen O'Connor Johnson & Kindness PLLC

[57] ABSTRACT

A fire seal (52) for an aircraft propulsion system including at least one mating plate pair (54) formed between a nozzle body (44) and an outer structure (24) and a support pylon (26). The mating plate pairs (54) each include an upper plate row (58) and a lower plate row (60), both rows extending in an arc (66) about an upper region (56) of the propulsion system, with a vertical overlap (88) existing between the upper and lower plate rows. A gap (90) exists between the upper plate row (58) and lower plate row (60) of each mating plate pair (54), preferably at all times. A seal region (62) exists between the forward-most mating pair and the aft-most mating pair. A pressure equalization mechanism controls pressure between the area forward of the seal region (62) and the area aft of the seal region (62). A number of endplates (110) are positioned at various longitudinal locations near the lateral ends of the mating plate pairs. A method of fire-sealing an aircraft propulsion system fire zone area including providing at least one mating plate pair (54) positioned between opposed surfaces in order to create a labyrinth path through which flame has difficulty passing. The method further includes controlling pressure between the area forward of the mating plate pairs and the area aft of the mating plate pairs.

17 Claims, 12 Drawing Sheets

AIRCRAFT LABYRINTH FIRE SEAL

FIELD OF THE INVENTION

The present invention relates to apparatus and methods for containing an aircraft, industrial, or power generation installation fire, and more particularly, to apparatus and methods for reducing the spread of an aircraft propulsion system fire to surrounding aircraft components.

BACKGROUND OF THE INVENTION

There are regulatory requirements for modem aircraft which require the containment of a fire created by a source within a power plant installation. The most obvious instance is of a fire created in an aircraft propulsion system, such as a gas turbine engine. Commercial aircraft propulsion systems are generally required to include a fire seal that is capable of containing and isolating a fire, not only from other propulsion system components (e.g., nacelles and engine fairings), but also from areas surrounding the propulsion system (e.g., wing struts and fairings). Currently, there are a number of disadvantages associated with known fire seals.

By way of example, FIG. 1 shows a gas turbine propulsion system 16 that includes a primary exhaust nozzle 18 connected to the aft end of a gas generator 20 that is housed in an inner shell or casing 20. Thrust reverser components or other various outer structures 24 surround portions of the inner casing 22 and nozzle 18. Typically, an aft engine mount (see FIG. 9, item 92) is located in this region for attaching the propulsion system to a support structure 26, e.g., a wing strut or pylon. In the example of FIG. 1, a fire zone 28 exists generally within the inner shell 22 and at the primary nozzle 18. A fire seal, such as seal 30 shown in FIGS. 1 and 2, is connected to an upper region of the nozzle and is oriented to inhibit flame from spreading aft of the generator or outward to the surrounding structures. The fire seal 30 forms a barrier across the upper area of the exhaust nozzle 18, roughly at the intersection of the nozzle and the support structure 26. In FIG. 1, this intersection is generally within the circle designated by the number 27.

One known fire seal arrangement is shown in FIG. 2, and due to its shape, is called a "turkey feather" fire seal 40. The turkey feather seal 40 consists of a circumferential sheet metal spring 42 formed of segmented steel "fingers" overlapped and attached to a primary exhaust nozzle body 44. Typically, a nozzle fairing 46 is included at a downstream location. The turkey feather fire seal 40 compresses against the lower surface of the support structure 26 and the outer structure 24 when the propulsion system is fully installed. The metal spring 42 is angled upward and then downward, in the forward direction, to provide a solid barrier so that flame cannot pass to downstream locations. This fire seal 40 thus protects the support structures, the wing structures, the surrounding fairings, and the aircraft fuselage from fire emanating from the gas generator, e.g., through an annular area the inner shell and exterior generator surface. (See also FIG. 9.)

There are a number of disadvantages in using turkey feather fire seals 40 in propulsion systems operating in high temperature and/or constant vibration environments. One disadvantage is the possibility of annealing of the seal 40, which can lessen the hard contact sealing force between the nozzle 18 and the support structure 26 and/or outer structure 24. A second disadvantage is potential wear at the seal contact surface due to any relative motion between components. Relative motion can occur due to such circumstances as high sonic vibrations or large relative thermal growth of adjacent components. Because the metal springs 42 are rounded at their contact edge, wear tends to concentrate across a contact line instead of a larger flat surface. The seals 40 can become very sharp as they wear through, causing a potential hazard to surrounding components and/or to maintenance crew.

There exists a need for an installation fire seal that does not allow flame to pass from one location to another and cause an additional fire hazard. Such a seal should ideally be highly reliable, especially in hostile operating environments, such as those found in propulsive systems. In particular, such an ideal aircraft, industrial, or power generation installation fire seal should be unaffected by high temperatures, vibrations, and relative motion between components. The present invention is directed to fulfilling this need.

SUMMARY OF THE INVENTION

The present invention provides a new type of fire seal for use in prohibiting flame from spreading within and around a power generation installation, and in particular, an aircraft propulsion system. This new seal is termed a labyrinth fire seal because it provides a maze, or labyrinth, through which flame has difficulty passing. The labyrinth fire seal formed in accordance with the present invention generally includes one or more mating plate pairs, each pair having an upper plate row and a lower plate row. During use, the upper plate row is positioned closely behind, but preferably not touching, the lower plate row. This gap between the upper plate row and the lower plate row should preferably be large enough to allow easy propulsion system installation and to avoid any contact between the upper and lower plate rows during use. A portion of in-plane overlap exits between the plate rows. The pairs are oriented generally perpendicular to the direction most likely for flame to travel.

As applied to one general configuration of an aircraft propulsion system, one embodiment of a labyrinth fire seal formed in accordance with the present invention includes two mating plate pairs. Each plate pair is positioned about an upper region of an exhaust nozzle body in a circumferential, stationwise direction. The lower plate row is connected to the nozzle body, and the upper plate row is connected to surrounding outer structures. The upper and lower plate rows extend in an arc of between about 45 to 135 degrees, a preferred arc being approximately 90 degrees.

In an embodiment for use with an aircraft gas turbine propulsion system having first and second outer cowl structures, the upper plate row is segmented to include a first cowl stationwise plate attached to the first cowl, a second cowl stationwise plate attached to the second cowl, and a pylon stationwise plate attached to a pylon support structure. The lower plate row is formed of a single piece, attached to the nozzle body using conventional methods.

In accordance with other aspects of the invention, the labyrinth fire seal preferably includes a number of endplates positioned in a generally longitudinal orientation at various locations between the mating plate pairs. The endplates provide additional fire barriers for errant flames. A seal region is defined in the area between the forward-most mating plate pair and the aft-most mating plate pair. In a preferred embodiment, the number of endplates includes at least two endplates positioned near the lateral ends of the mating plate pairs.

In accordance with still further aspects of the invention, a pressure equalization mechanism is provided to ensure a low pressure ratio between the areas surrounding the seal region, and in particular the area forward of the seal region and the area aft of the seal region. The pressure ratio is optimally less than about two to one. The preferred arrangement for realizing the pressure equalization mechanism is to keep a passage open between the seal side areas and the seal aft areas by simply limiting the distance the endplates are allowed to extend aftward.

In accordance with yet other aspects of the invention, protective flaps may be used to shield the seams created between adjacent components, such as between adjacent plates. The protective flaps provide yet another barrier through which flame has difficulty passing. Fire bulb seals are provided as necessary to prohibit flame from passing through an area between the support structure and the outer structures.

In accordance with yet further aspects, a method of fire sealing a propulsion system in accordance with the present invention is provided including the steps of providing at least one mating plate pair positioned about the propulsion system. The at least one mating plate pair includes upper and lower plate rows connected to generally opposed surfaces in a propulsion system fire zone. The at least one mating plate pair is for creating a labyrinth path through which flame has difficulty passing. The method further includes the step of positioning the upper and lower plate rows near each other to form a gap therebetween and a portion of vertical overlap. In a preferred method, the pressure ratio between the area forward of the mating plate pairs and the area aft of the mating plate pairs is kept to a low value. This ensures that flame will not inadvertently spread due to a suction from the area aft of the mating plate pairs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
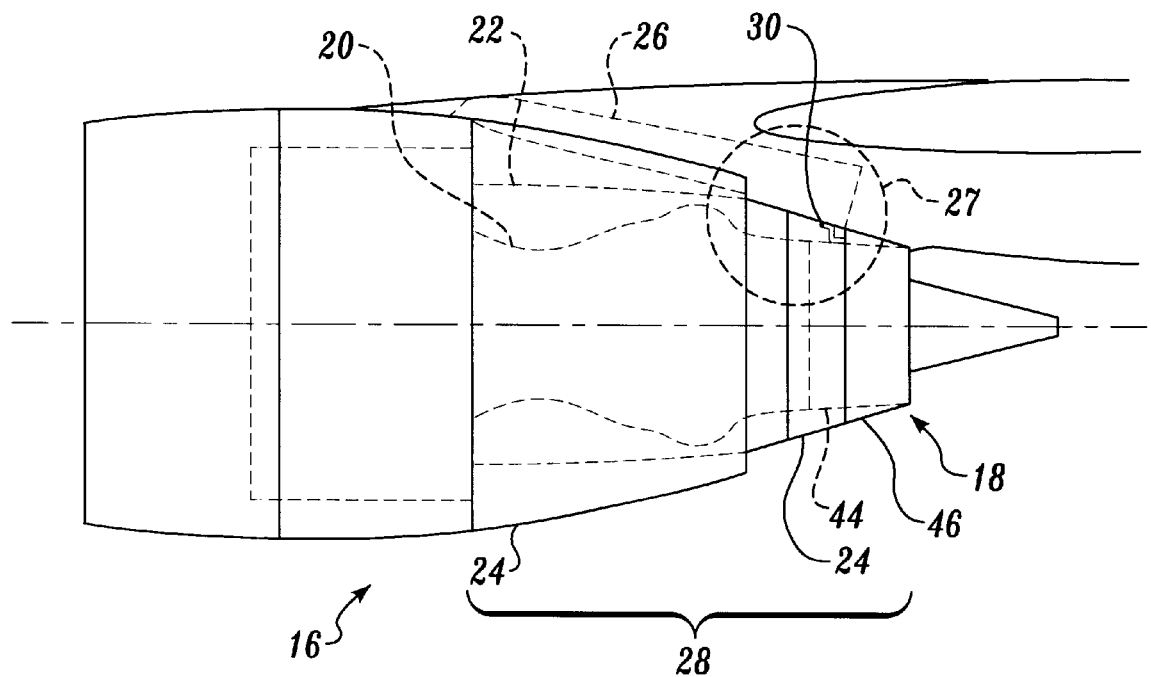
FIG. 1 is a side view of an example prior art aircraft propulsion system.
Figure 2:
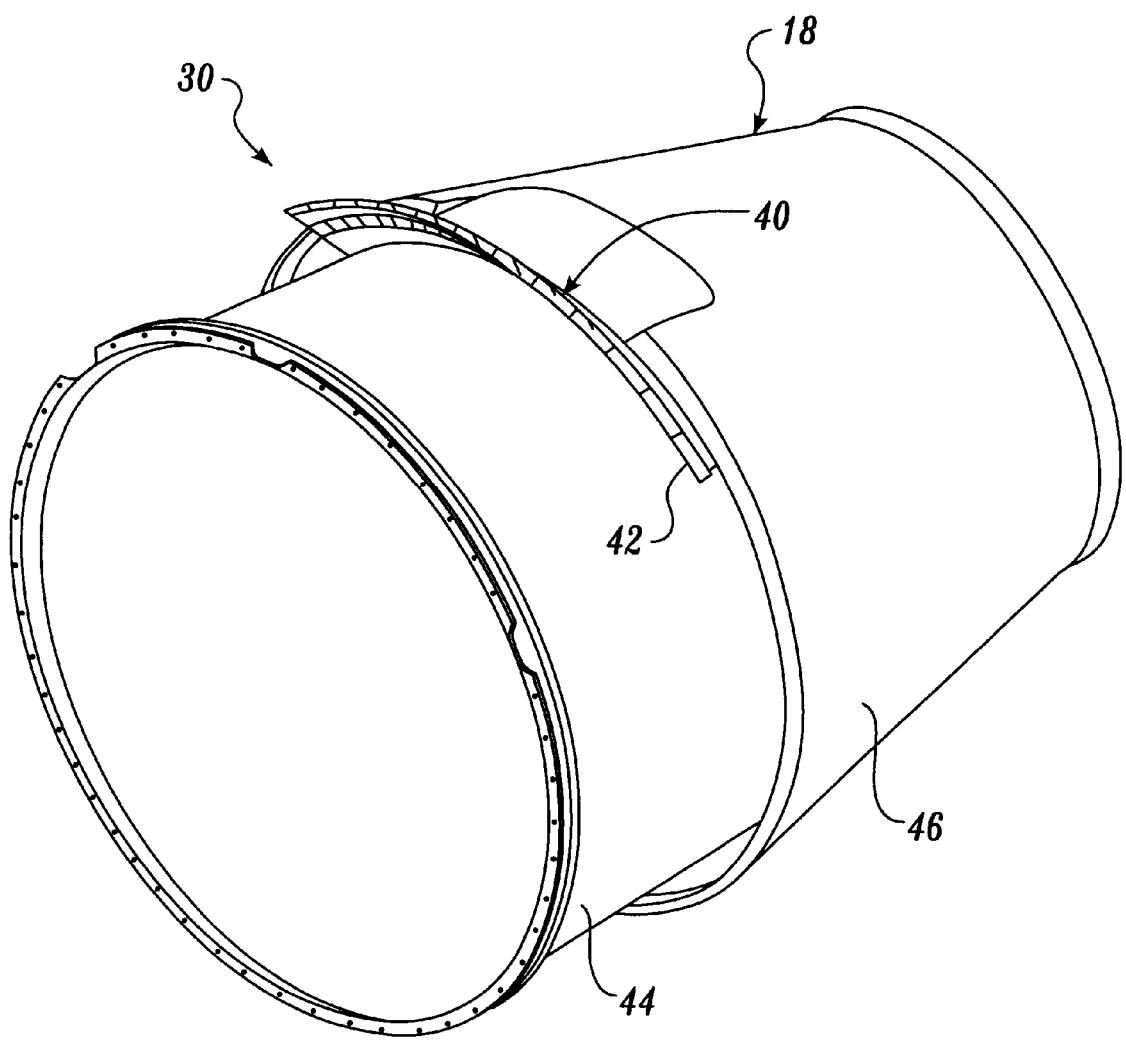
FIG. 2 is a front perspective view of an example prior art fire seal.

The present invention is referred to as a labyrinth fire seal 52 in the discussion below. The seal 52 provides a series of mating, but preferably not contacting, plates which overlap to provide a torturous path, or labyrinth, through which fire and flames having difficulty passing. This path effectively prohibits flame from reaching surrounding areas and causing an additional fire hazard.

As will be appreciated by those skilled in the art, the present invention labyrinth fire seal is configurable to a wide range of power generation installation applications, including, but not limited to, aircraft propulsion systems, ship engines, electrical generators, auxiliary power units, etc. For illustrative purposes, the labyrinth seal is described below with regard to an aircraft propulsion system, and in particular, an aircraft gas turbine propulsion system. This selection of application area is not intended to limit the scope of the present invention, but is only intended to provide a way in which aspects of the labyrinth fire seal may be discussed and illustrated.

In general, the labyrinth fire seal 52 of the present invention includes one or more mating plate pairs 54, each pair having an upper plate row 58 and a lower plate row 60. During use the upper plate row is positioned closely behind, but preferably not touching, the lower plate row. A portion of in-plane overlap exits between the plate rows. The pairs are oriented generally perpendicular to the direction most likely for flame to travel. As applied to one configuration of an aircraft propulsion system, one embodiment of a labyrinth fire seal formed in accordance with the present invention includes two mating plate pairs. Each plate pair is positioned about an upper region 56 of the primary exhaust nozzle body 44 in a circumferential, stationwise orientation. The lower plate row 60 is connected to the nozzle body 44, and the upper plate row 58 is connected to surrounding outer structures 24. For this particular embodiment the labyrinth fire seal 52 also preferably includes a number of endplates positioned in a generally longitudinal orientation at various locations along and between the mating plate pairs 54. The endplates provide additional fire barriers for errant flames and/or fire and are discussed in detail below.

In FIGS. 3–12 various detail views of the mating plate pair 54 are shown. The preferred number of mating plate pairs is two pairs for aircraft gas turbine propulsion systems. This number was found during testing to be sufficient to stop flames from passing to downstream locations, while not being prohibitively heavy or complicated. Other numbers of pairs 54 may be used depending on the circumstances of a particular power generation installation application. A seal region 62 is defined to exist between the forward-most mating plate pair and the aft-most mating plate pair. See FIGS. 4 and 9.

Figure 3:
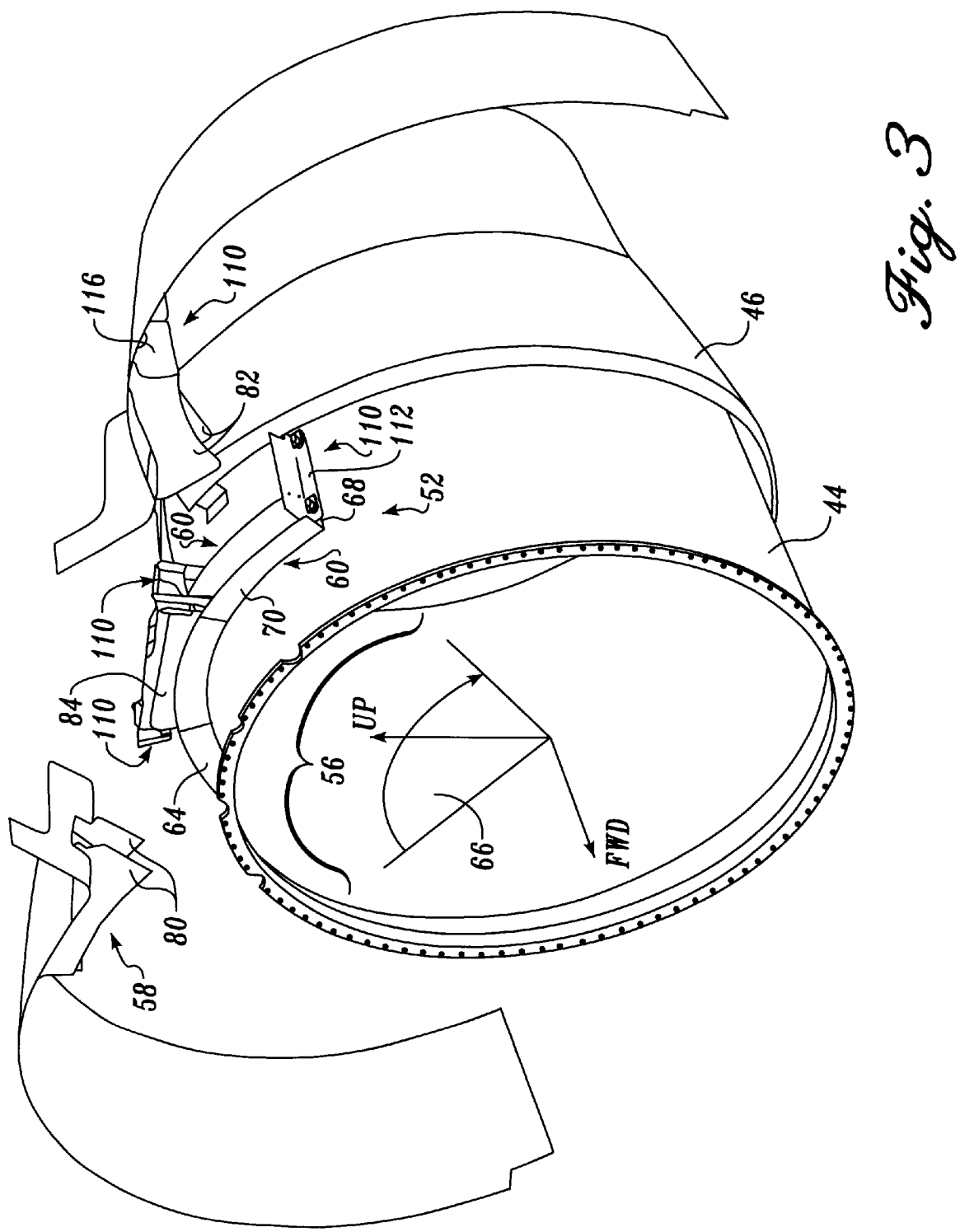
FIG. 3 is a front perspective view of a labyrinth fire seal formed in accordance with the present invention for use with a power plant installation, the labyrinth seal being shown as applied to an aircraft propulsion system, various system details being omitted for illustrative purposes.
Figure 4:
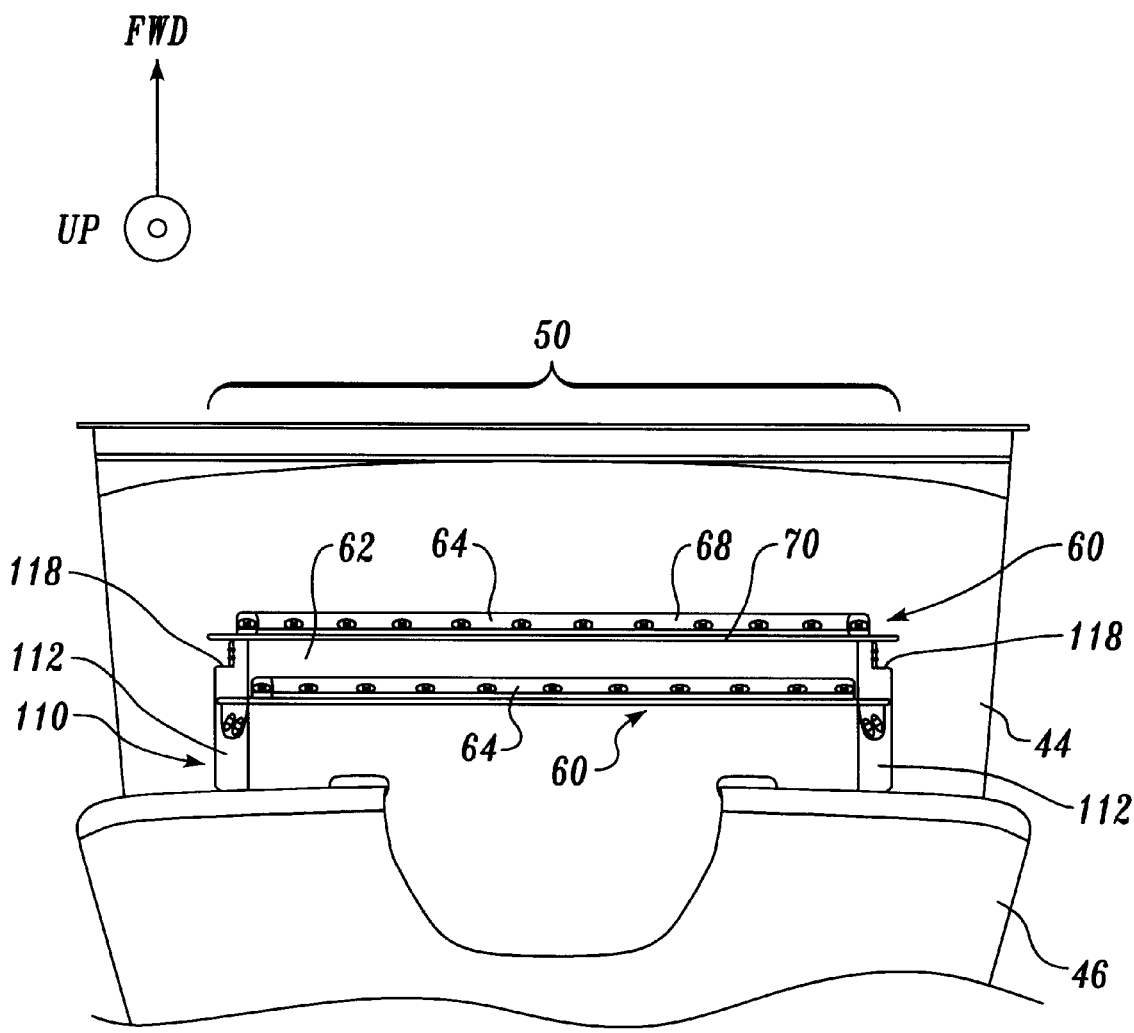
FIG. 4 is a top down view of a preferred embodiment of lower plate rows formed in accordance with the present invention.

As shown in FIGS. 3 and 4, the lower plate row 60 includes a nozzle stationwise plate 64 attached to the outer circumference of the nozzle body upper region 56 in an arc 66 of approximately 90 degrees. For the configurations of FIGS. 3 and 4, 90 degrees was determined to provide an arc length within which flame and/or fire would be most likely to spread from the generator to the surrounding non-engine components. Plate row arc lengths (or widths, if not curved) as large or small as practical may be used for other configurations. The middle of the nozzle stationwise plate aligns generally with the middle of the support structure 22 when viewed from the front looking aft. See FIG. 10. In FIG. 4, the nozzle stationwise plate 64 is illustrated as a single, continuous pieces Alternatively, as shown in FIG. 3, the nozzle stationwise plate 64 may be formed of segments positioned generally end-to-end.

A further variation is seen in the attachment technique used in FIGS. 3 and 4. In FIG. 3, the nozzle stationwise plate 64 is formed generally in an L-shape, with a foot portion 68 extending aft of a vertical portion 70. In FIG. 4, the opposite occurs, where the foot portion 68 extends forward of the vertical portion 70. Either arrangement will work equally as well, although one technique may be easier to produce and/or install than the other in a particular application. The nozzle stationwise plate 64 may be attached to the nozzle using any one of a number of known methods, e.g., welding, riveting, bolting, etc. The foot portion 68 is bolted directly to the nozzle body 44 in FIG. 4. Removable plate attachment methods are preferred since they allow easier replacement in the event a plate is damaged.

The upper plate row 58 may also be formed as a single continuous piece, or alternatively, may be formed of segments positioned generally end-to-end. Some aircraft propulsion systems have outer nacelles, cowl panels, thrust reverse halves, etc., that must be movable or separable from adjacent structures. For such systems, the upper plate row will necessarily need to be segmented if the upper plate row extends onto the movable segment or requires support therefrom. The particular propulsion system of FIG. 5 requires that the upper plate row 58 be divided into at least three upright plates—a first cowl stationwise plate 80, a second cowl stationwise plate 82, and a pylon stationwise plate 84. Such a division of plates allows the outer structures, e.g., thrust reverser halves or cowls, to open and/or allow access to various portions of the propulsion system. These upright plates 80, 82, 84 are located generally end-to-end, at substantially the same stationwise location.

Figure 5:
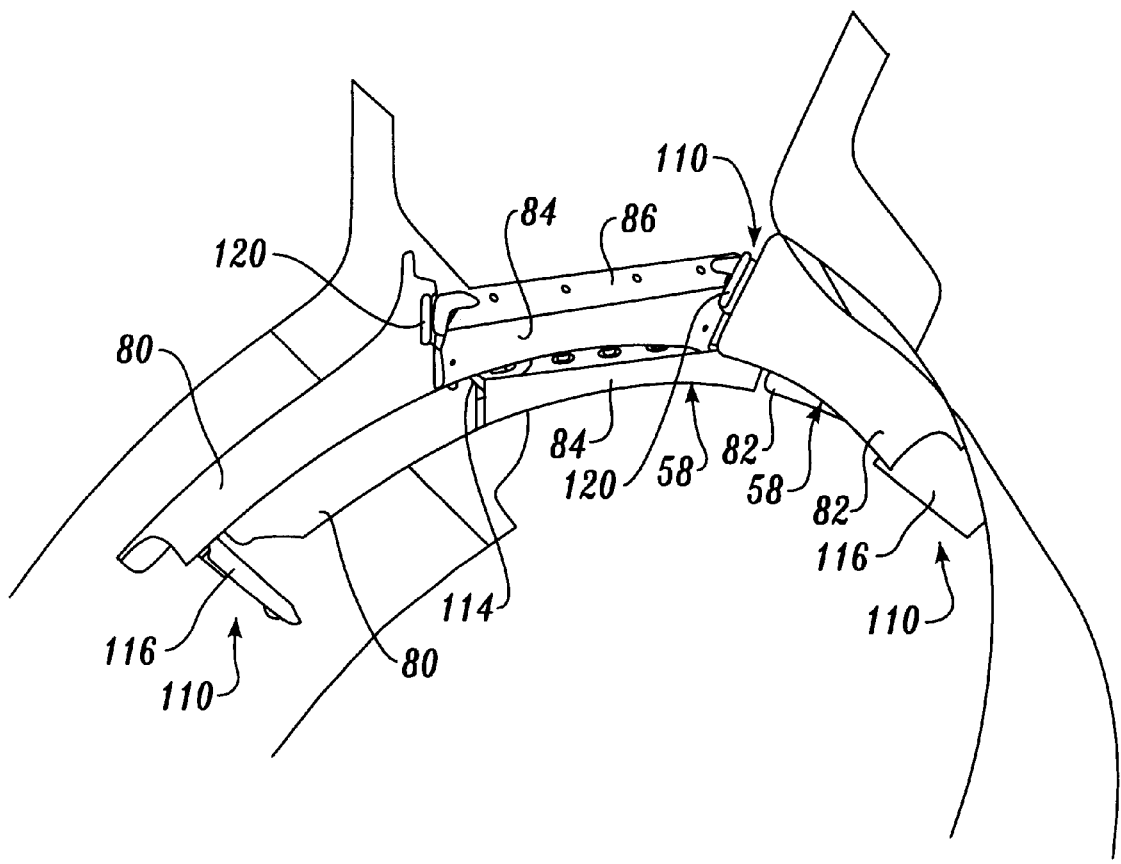
FIG. 5 is a front perspective view looking upward and aftward of a referred embodiment of upper plate rows formed in accordance with the present invention.
Figure 6:
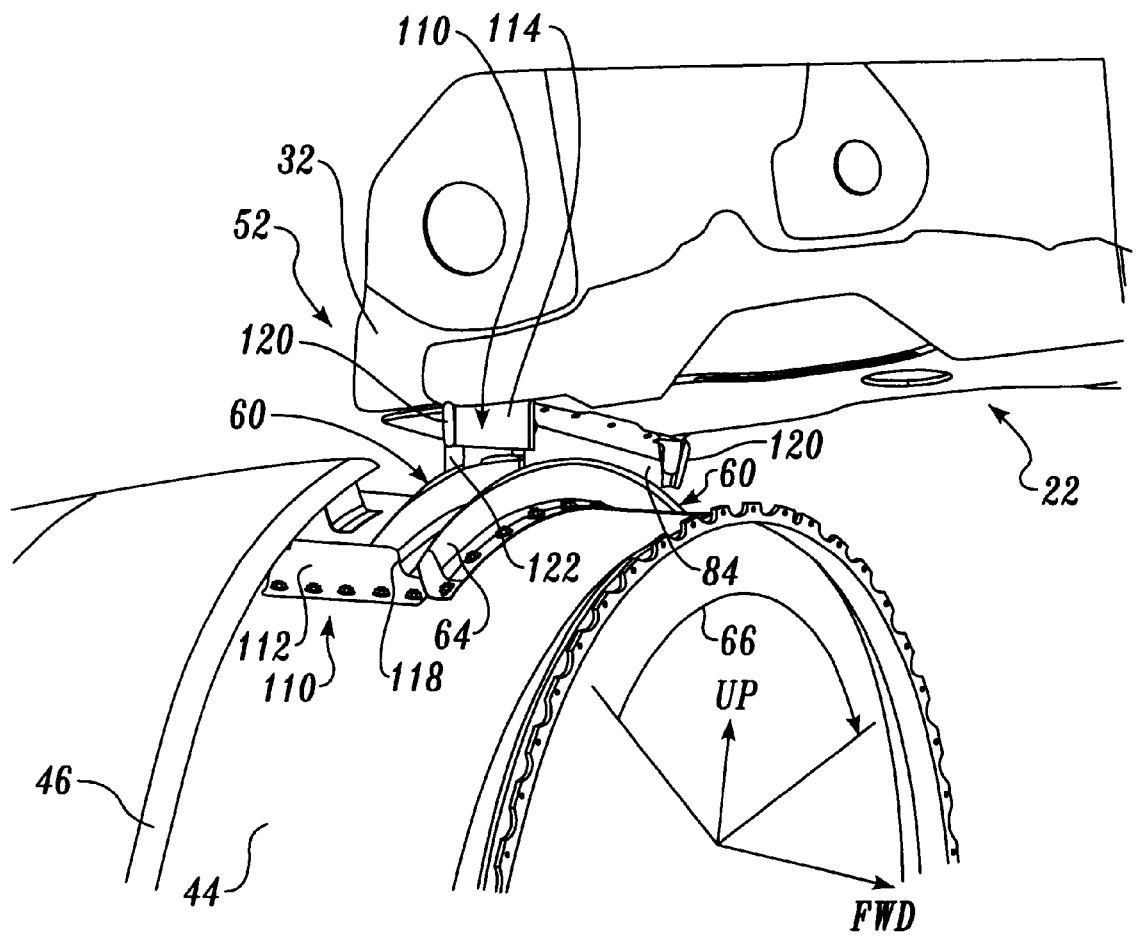
FIG. 6 is a front perspective view of a preferred embodiment of pylon stationwise plates formed in accordance with the present invention.

In FIG. 6, the pylon stationwise plate 84 is shown attached to the support structure pylon 26. In FIG. 5, the first and second stationwise plates 80, 82 are shown attached to their respective cowls. Similar to the nozzle stationwise plate 64, one method of attaching the upper row plates shown in FIGS. 5–8 is to configure the plates with an L-shaped cross-section, with a foot portion 86 being used to connect the plate to its support structure, (e.g., pylon and cowls) using conventional methods. As discussed above, the various plates of the labyrinth seal may be attached to support structures, again, using any one of a number of methods.

Figure 9:
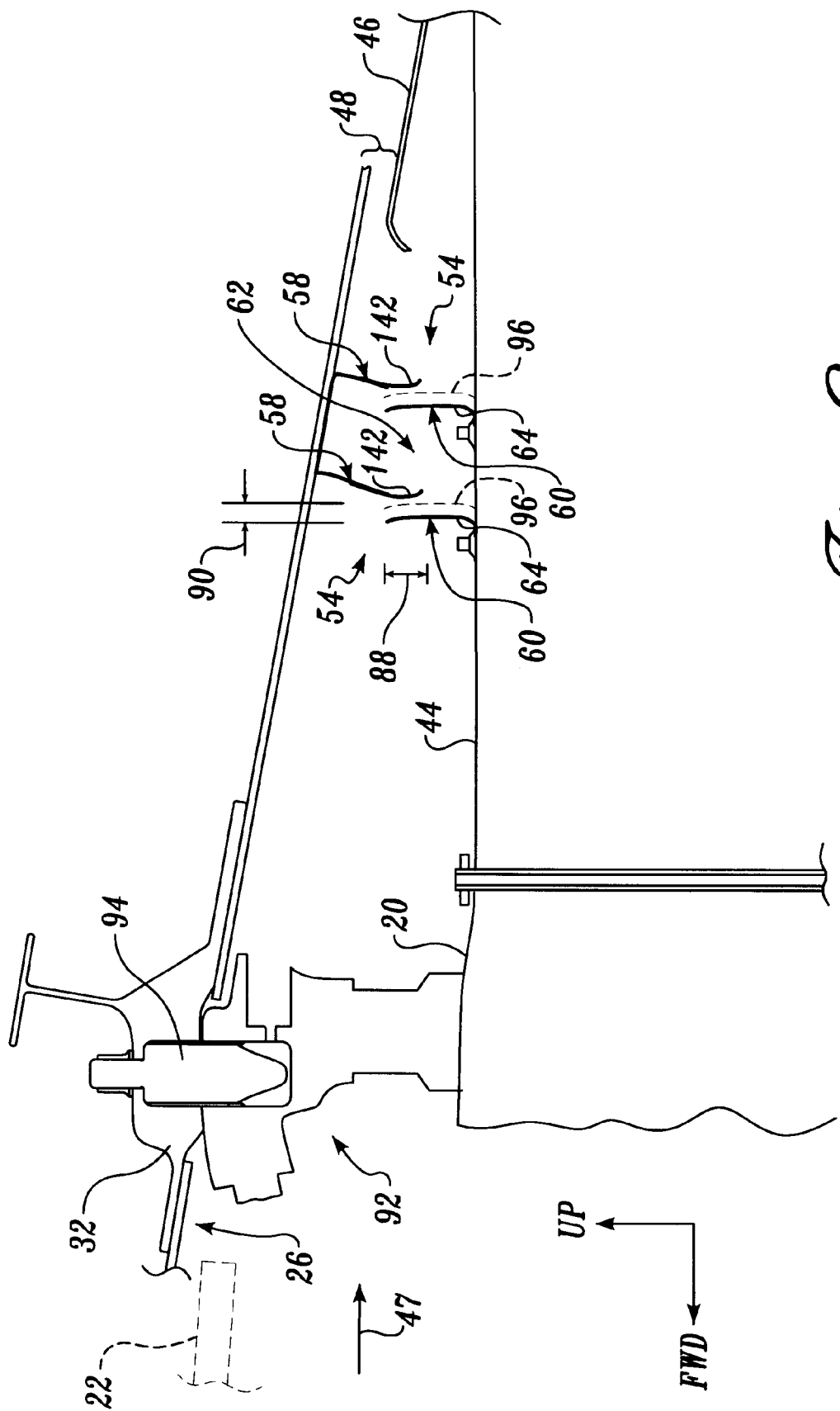
FIG. 9 is a cross-sectional side view of the labyrinth fire seal of FIG. 6.
Figure 10:
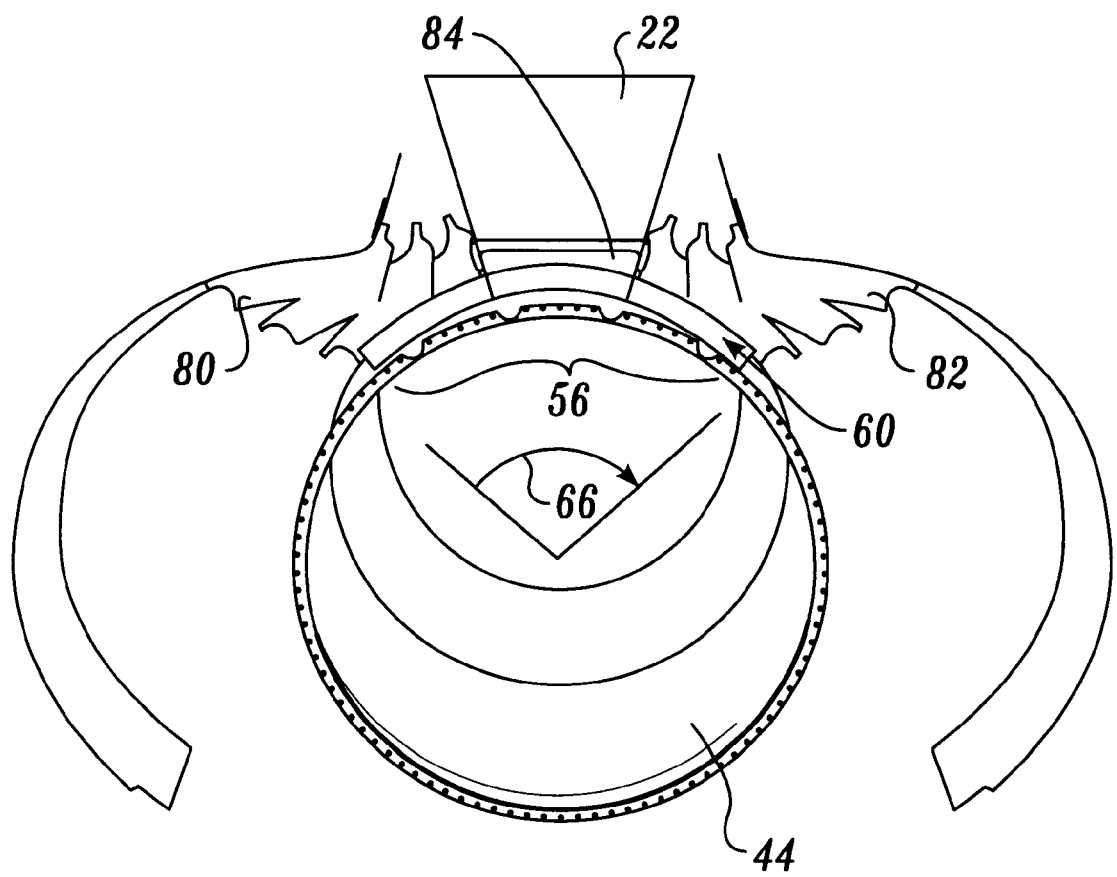
FIG. 10 is a front perspective view of the labyrinth fire seal of FIG. 3.
Figure 11:
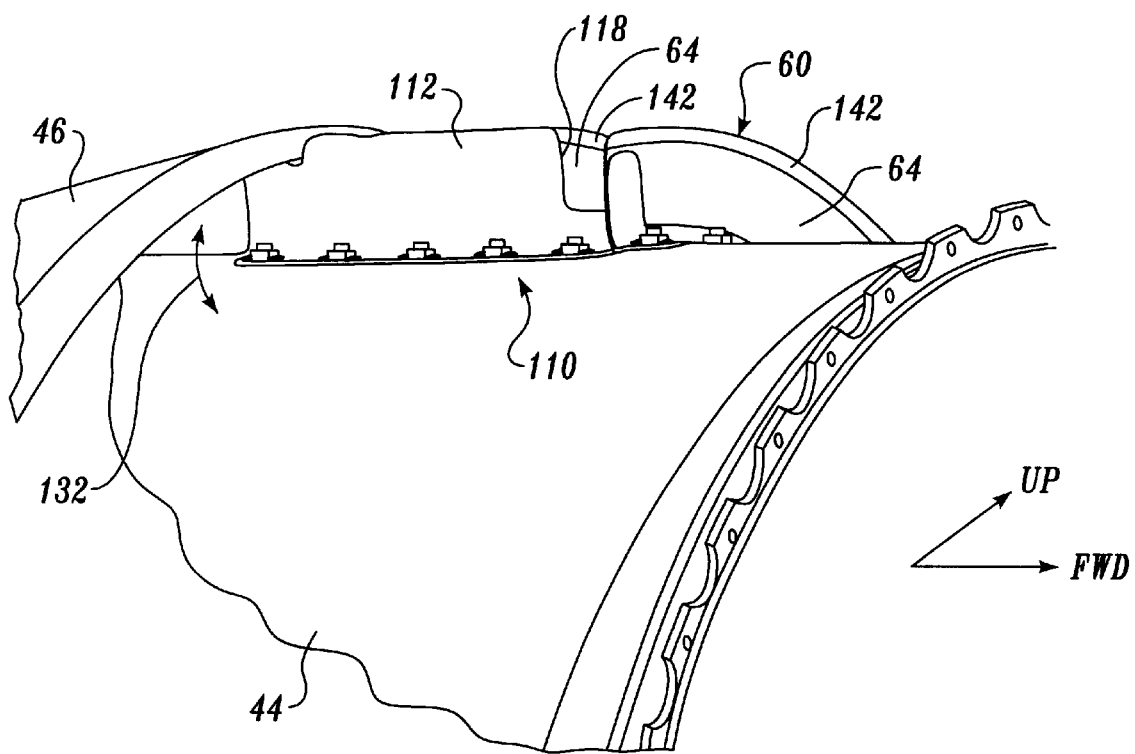
FIG. 11 is a detail perspective view of an upright endplate formed in accordance with the present invention.

The upper and lower plate rows 58, 60 are sized to form an overlap 88 in an in-plane direction during use (i.e., vertically for the configuration of FIG. 9). This is important to the present invention since the overlap 88 provides part of the twisted path through which flame has difficulty passing. The amount of overlap 88 is preferably as large as possible, considering system installation and removal requirements and other design issues.

For the propulsion system shown in FIGS. 3–11, the maximum amount of overlap 88 may be determined by the length of an aft engine mount shear pin 94. The shear pin length, during propulsion system removal or installation, determines the point at which the engine is no longer free to move horizontally as it is being raised or lowered. Vertical overlap of the seal plates should optimally be delayed until the shear pin 94 is partially engaged with the mount 92. If the seal plate overlap is greater than the aft mount shear pin length, damage to the seal plates could occur during a propulsion system change. The minimum overlap may be established by test as a function of the number of plate pairs, the horizontal distance between pairs, the pressure differential across the seals, etc. It is helpful to design the upper and lower plate rows 58, 60 with oppositely oriented angled end portions 142 to reduce the likelihood of plate damage should inadvertent plate contact occur during engine installation or removal.

There is a slight gap 90 between the upper plate row 58 and the corresponding lower plate row 60. The gap should be large enough to allow the nozzle shear pin 48 to move freely during propulsion system removal or installation. A minimal clearance preferably continues to exist during use in order to allow for the relative motion between the nozzle 18 and the supporting strut structure 26, even during rearward thermal growth of the propulsion system at high operating temperatures. The phantom lines 96 of FIG. 9 represent the rearwardly displaced lower plate rows 60 that may occur during use. A maximum preferred gap size is about 2.5 mm (0.1 inches) to 5.0 mm (0.2 inches) during high temperature use.

As illustrated in FIG. 9, the lower plate row 60 is positioned forward of the upper plate row for all mating plate pairs 54. This situation may be reversed, where the lower plate row 60 is positioned aft of the upper plate row 58 for all pairs. It is not recommended, however, to intermix these configurations between or within mating plate pairs. In general, the decision whether to place the upper or lower plate row first should be based in part on the direction of engine thermal growth and on the direction of anticipated flame travel.

In FIG. 9, the labyrinth fire seal 52 is positioned behind the aft engine mount 92. In such arrangements, a designer should anticipate rearward engine growth during use. Because a small plate gap 90 is more restrictive to air flow, it is advantageous to place the lower plate row 60 forward of the upper plate row 58, so that thermal expansion rearward of lower plate 60 achieves the desired effect. An added benefit of the configuration of FIG. 9 is that the seal gap 90 is at a maximum size during nozzle installation or removal, since engine change is accomplished when the engine is cold. This provides a desirable plate row clearance margin.

In addition to the mating plate pairs 54, it is preferable to include various buttwise plates, or endplates 110. See FIGS. 3, 7 and 8. These endplates 110 act as additional fire barriers to prevent flames from simply going around the ends of the mating pairs 54. Described herein are two sets of endplates 110: (1) a pair of upright endplates 112; and (2) a pair of cowl endplates 116. It is preferable for at least one endplate to be present at each lateral outboard end of the fire seal 52. Additional endplates 110 may be added as needed. As with mating plate pairs, the more endplates 110 used, the more difficulty flame has in sustaining itself past the labyrinth seal 52. If endplates are omitted entirely, the width of the labyrinth seal may need to be increased in order to provide proper fire protection.

Shown in FIG. 4, one upright endplate 112 is provided at each lateral side of the mating plate pairs 54 and extends aftward to the nozzle fairing 46. The upright endplates 112 of this particular application are located along planes extending generally longitudinally and radially at angles of about +45 degrees and −45 degrees from a longitudinal-vertical centerplane. See FIG. 10. The upright endplates 112 may be attached to the nozzle body 44 in a known manner, e.g., welding, bolting, riveting, etc. The upright endplates 112 are approximately the same height as the lower plate row 60. Because of the potential space conflict between the upper plate row 58 and any of the endplates, a designer should include appropriate contours to accommodate one into the other. For example, in FIGS. 4, 6, and 11, a small cutout or notch 118 is formed in the forward outer region of each endplate so that the upper plate row 58 of the first mating pair will not touch the endplate at any time during use, even with a hot engine 16. Alternatively, the cutout 118 may instead be formed in the upper plate row 58 to accommodate an endplate.

Figure 7:
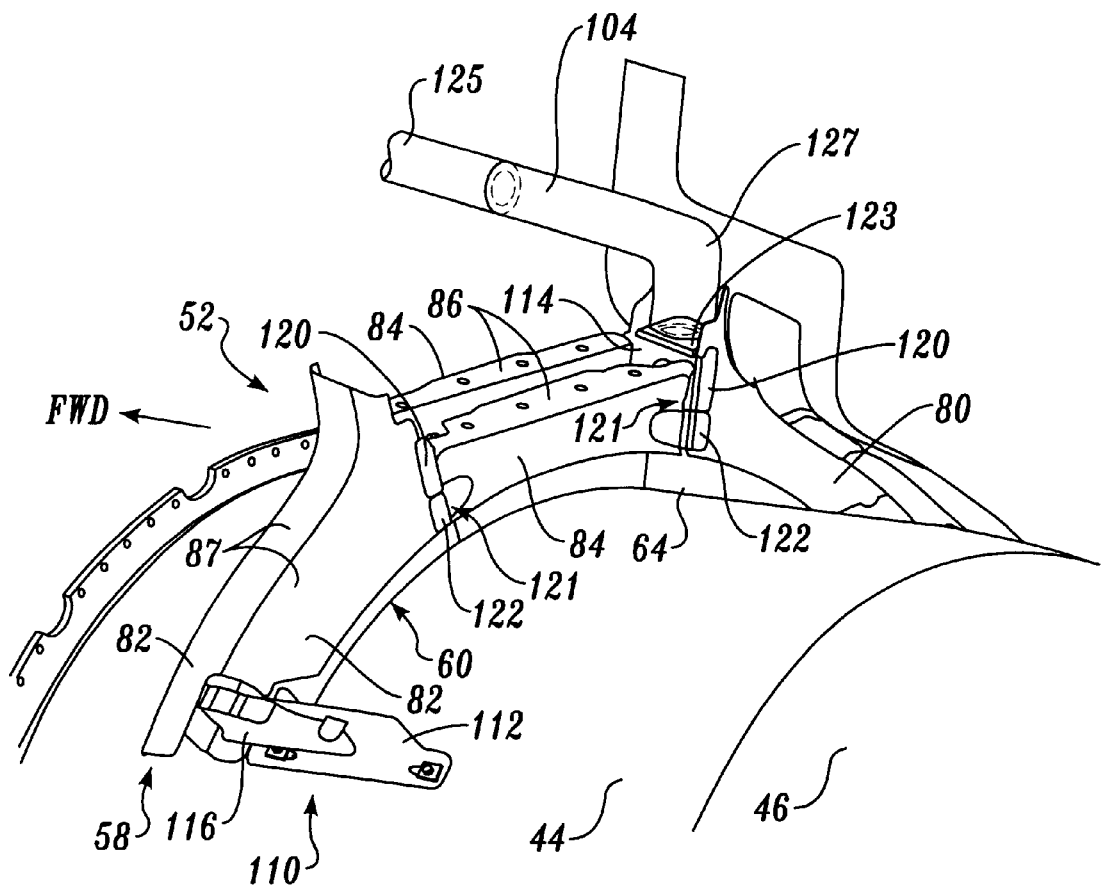
FIG. 7 is a front perspective view looking downward and forward of a preferred embodiment of a fire bulb seal formed in accordance with the present invention.
Figure 12:
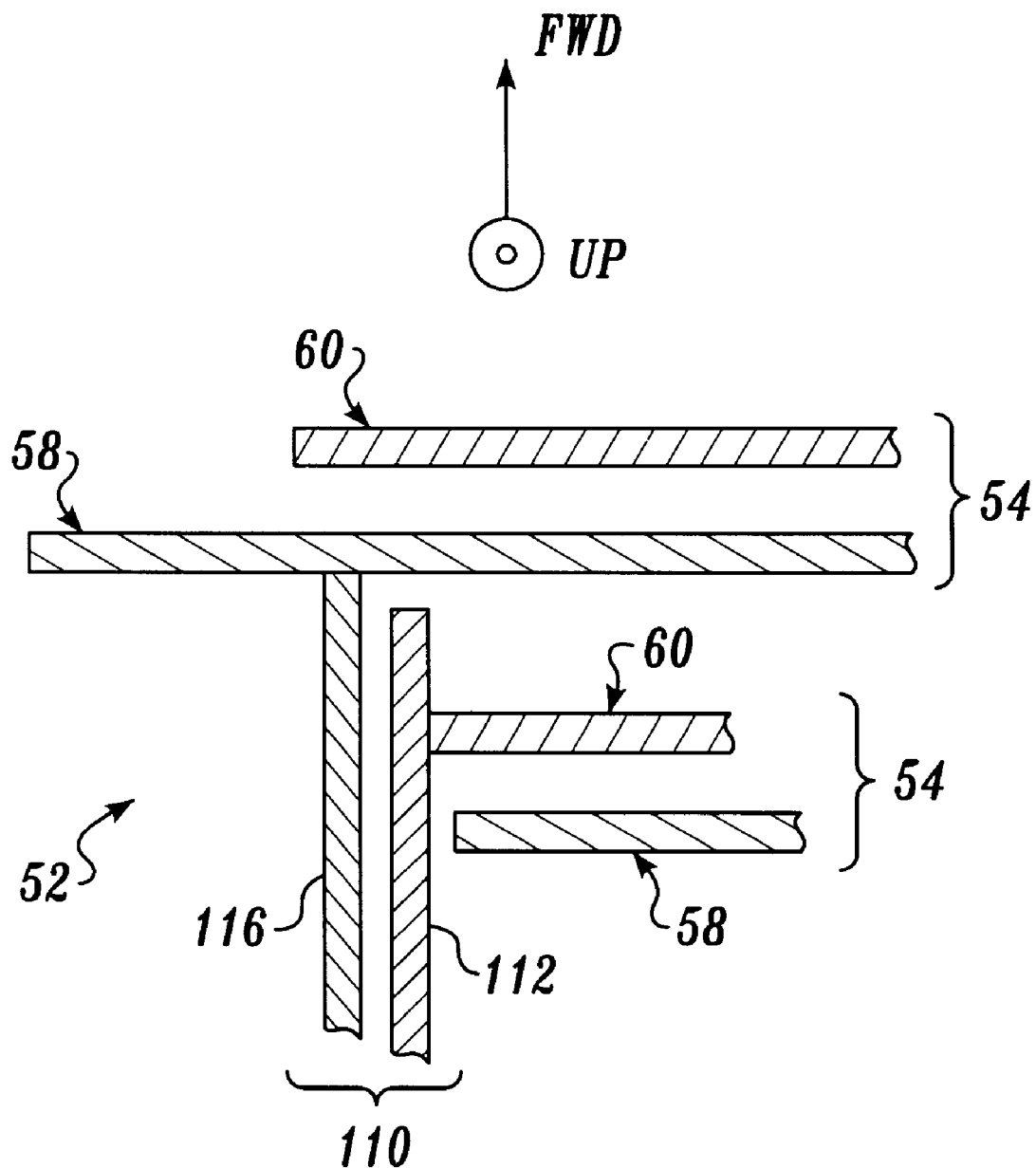
FIG. 12 is a cross-sectional plan view of an area near the lateral ends of a labyrinth seal formed in accordance with the present invention.

Referring to FIGS. 5 and 7, the cowl endplates 116 are located at the outboard lateral ends of both the first and second outer structure cowls. The cowl endplates 116 are attached to their respective cowls using any one of a number of known methods. The cowl endplates 116 are positioned outboard and very close to, but not contacting, the upright endplates 112. FIG. 12 is a cross-sectional view of the forward outboard area of the seal, near the second cowl. The view is taken generally tangential to the nozzle body 44. As shown, the combination of the mating plate pairs 54, the upright endplates 112, and the cowl endplate 116 forms a maze through which flame will have difficulty passing. The mirror image configuration exists at the forward outboard area near the first cowl. As may be appreciated from the above description and illustrations, the embodiments of FIGS. 7 and 8 may equally be described as having "pairs" of endplates similar to the description of the mating plate pairs 54. It has been found that singular endplates may be sufficient in some instances. Likewise, singular plate rows when used in conjunction with at least one mating plate pair, may also be sufficient for some applications.

A pair of pylon sideplates 114 are attached to and extend between the lateral ends of the pylon stationwise plates 84 at a location coinciding generally with the lateral sides of the support structure 22. In FIGS. 5–8, the pylon endplates 114 preferably include a number of transverse (stationwise) edge flaps 120 to envelope adjacent cowl stationwise plates 80, 82. The edge flaps 120 provide yet another turn through which flame will have difficulty passing. In addition, any joint may be fitted with a protective flap 121 to shield the joint seam. For example, in FIG. 7, a small flap 122 is attached to the aft-most pylon stationwise plate to cover the lower portion of the seam between it and the aft-most cowl stationwise plate.

The above described plates may be formed of any one of a number of known materials. Example materials include: steel, titanium, ceramics, composites, etc. Important issues to consider when selecting a material include maximum and average operating temperatures, vibration environment, structural capability, potential for plate damage during installation, ease and cost of replacing a component, required length of component life, wear characteristics, and so forth. A preferred design practice is to use the same material for the nozzle-mounted plates as used for the nozzle itself This ensures matched thermal growth characteristics between the nozzle-mounted plates and the nozzle body, so as to not induce thermal stress into the plates or the nozzle. The strut and cowl-mounted plates should preferably be fire proof, easily produced, durable, and repairable.

In the propulsion system of FIGS. 3–11, a small amount of air (labeled arrow 47 in FIG. 9) is passed between the inner shell and the exterior of the generator 20. The air 47 is ventilated downstream through an annular gap 48 formed by the space between the nozzle fairing 46 and the support structure 26 and/or outer structures 24. During use, the air continuously moves aft from the relatively high pressure generator region to the relatively low pressure nozzle fairing region. If a fire were to occur in the generator, the flames would naturally propagate from the high pressure region through the gap toward the lower pressure region.

It is important to the present invention to include a pressure equalization mechanism to allow the pressure aft of the seal region 62 to equalize, or at least approximate, the pressure forward of the seal region 62. For some gas turbine propulsions systems, this pressure control capability can be critical to the proper functioning of the labyrinth fire seal 52. This is because the relative pressure difference ahead and behind the fire seal can be large enough to actually "draw air" from the fire zone compartment via the annular gap 48. If flames are present at the gap, they present a fire hazard to the surrounding structures.

The pressure equalization mechanism helps ensure a low pressure ratio of pressure forward of the seal to aft of the seal. A maximum preferred pressure ratio for the seal 52 to operate effectively is partially dependent upon the size of the gap 90 between the various plates and the overlap 88 of the plates. Representative pressure ratio values include between about 2.0:1.0 (i.e., forward to aft pressures). Since the labyrinth fire barrier must function properly, even when the engine is cold (and the gap 90 is potentially large), it is preferred that the pressure ratio between the forward and aft sides be kept small, e.g., less than about 1.5.

One way to realize a pressure equalization mechanism is to keep an open passageway between the areas lying to the sides and aft of the labyrinth seal 52. This may be accomplished by simply limiting the distance the upright endplates 112 are allowed to extend aftward. For example in FIG. 11, the length of the upright and cowl endplates is longer than the anticipated flame propagation length, yet short enough to allow airflow between the regions forward and aft of the seal in order to minimize the pressure ratio across the seal. As shown by double-headed arrow 132 of FIG. 11, air may flow easily from the side area to the aft area. In this way, pressure will naturally equalize by flowing relatively freely about the seal 52, without additional apparatus components and without any moving parts.

Figure 8:
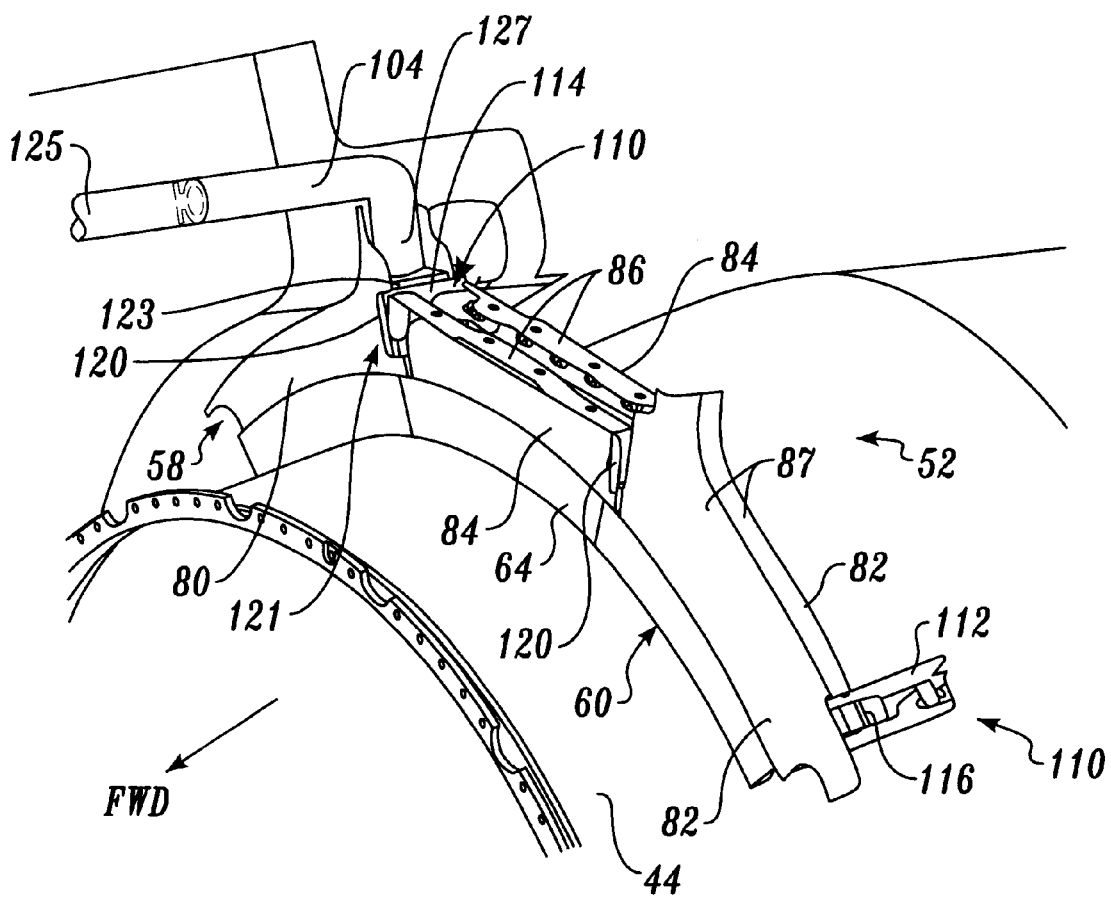
FIG. 8 is a back perspective view looking downward and aftward of the fire bulb seal of FIG. 7.

Fire bulb seals 104 may be provided for each cowl where appropriate, to prevent fire from escaping radially outward from between the cowlings and the support structure. Referring to FIGS. 7 and 8, a fire bulb seal 104 is installed at an upper cowl region, just below the cowl hinge line. Each bulb extends at one end 125 from a forward edge of a thrust reverser cowl, with the opposed bulb end 127 terminating at a bulb seal endplate 123 located between the mating plate pairs. The bulb seals close off the upper and upper forward edges of the core fire zone. An example bulb seal is about 1.5" inches in diameter or larger and made of conventional materials, e.g., rubber/fiberglass covered with Nextel™ fabric. The bulb seal endplate prevents direct flame contact on the fire bulb seal. The fire bulb seals are not required if there are no radial passages through which flame may pass. Other conventional fire bulb seals may be used as well as other minor fire seals at the unique crevices of a particular power generation installation.

Referring to FIG. 9, the nozzle stationwise plate 64 is attached to the nozzle body prior to installation of the engine to the support structure. Likewise, the first and second cowl stationwise plates and pylon stationwise plate are attached to their respective structures prior to installation of the engine. In the configuration of FIG. 9, the engine and nozzle are brought toward the strut to interconnect the aft mount with the shear pin 94. The upper and lower mating plate rows are simultaneously moved toward each other. The plates are not allowed to contact or interfere with each other, otherwise damage to the plates may occur. To remove the engine, the shear pin is released and the engine and nozzle are carefully lowered, thus separating the upper and lower plate rows.

While the preferred embodiment of the invention has been illustrated and described, it will be appreciated that various changes can be made therein without departing from the spirit and scope of the invention. For example, other maze-like configurations of plates may be used. The important feature of the present invention is the multiplicity of corners and turns, in all directions, that are presented and through which flame has difficulty passing.

The embodiments of the invention in which an exclusive property or privilege is claimed are defined as follows:

1. A fire seal for an aircraft power generation system for discouraging the passage of flame between two regions, the aircraft power generation system having a first surface in opposed relation to a second surface, the fire seal comprising at least one mating plate pair formed between the first surface and the second surface and oriented in a manner transverse to an anticipated direction of flame travel, each mating plate pair comprising an upper plate row and a lower plate row, both rows being positioned between the first and second surface in a generally parallel-planar orientation, a portion of noncontacting overlap existing between the upper and lower plate rows; and further including a means for equalizing pressure between the area forward of the fire seal and the area aft of the fire seal.

2. The fire seal according to claim 1, further including two upright endplates, one endplate being provided near each lateral end of the at least one mating plate pair.

3. A fire seal for an aircraft propulsion system having a nozzle body located aft of an engine generator, the propulsion system being attached to a support pylon, the nozzle body being at least partially surrounded by an outer structure, the fire seal comprising:
    (a) at least one mating plate pair comprising:
        (i) a lower plate row attached to the nozzle body; and
        (ii) a upper plate row attached to the outer structure at the general location of the lower plate row, a portion of overlap existing between the upper and lower plate rows; and
    (b) means for equalizing pressure between the area forward of the fire seal and the area aft of the fire seal.

4. The fire seal according to claim 3, wherein the aircraft propulsion system includes an engine mount for use in connecting the propulsion system to the support pylon, the engine mount being located forward of the fire seal, wherein the upper and lower plate rows are sized and shaped to allow the installation of the propulsion system by connection of the engine mount to the support pylon, the installation being accomplishable without the upper and lower plate rows normally contacting one another.

5. A fire seal for an aircraft propulsion system having a nozzle body located aft of an engine generator, the propulsion system being attached to a support pylon, the nozzle body being at least partially surrounded by an outer structure, the fire seal comprising:
    (a) at least one mating plate pair comprising:
        (i) a lower plate row attached to the nozzle body; and
        (ii) a upper plate row attached to the outer structure at the general location of the lower plate row, a portion of overlap existing between the upper and lower plate rows; and
    (b) means for equalizing pressure between the area forward of the fire seal and the area aft of the fire seal; wherein the at least one mating plate pair is at least two mating plate pairs; the fire seal further comprising a fire seal region existing generally between the forward-most mating plate pair and the aft-most mating plate pair; the fire seal further comprising at least one endplate located near the lateral ends of the at least two mating plate pairs and extending substantially between the forward-most pair to the aft-most pair.

6. A method of fire-sealing an aircraft propulsion system fire zone area comprising the steps of providing at least one mating plate pair having upper and lower plate rows connected to generally opposed surfaces in a propulsion system fire zone, the at least one mating plate pair for creating a labyrinth path through which flame has difficulty passing; and positioning the upper and lower plate rows near each other to form a gap therebetween and a portion of noncontacting in-plane overlap; and equalizing pressure between the area forward of the mating plate pairs and the area aft of the mating plate pairs.

7. A method of fire-sealing an aircraft propulsion system fire zone area comprising the steps of providing at least one mating plate pair having upper and lower plate rows connected to generally opposed surfaces in a propulsion system fire zone, the at least one mating plate pair for creating a labyrinth path through which flame has difficulty passing; and positioning the upper and lower plate rows near each other to form a gap therebetween and a portion of vertical overlap,
    further comprising the step of providing endplates positioned at the lateral ends of the mating plate pairs, the endplates for adding additional corners to the labyrinth path.

8. An exhaust fire seal for an aircraft gas turbine propulsion system having a circular aft nozzle body located aft of a gas generator, the aft nozzle body lying near a support pylon and being partially surrounded by first and second outer cowls, the fire seal comprising:
    (a) at least one mating plate pair formed between the aft nozzle body and both the support pylon and the first and second cowls, the mating plate pairs each including an upper plate row and a lower plate row, both rows lying in a generally upright and stationwise orientation about the aft nozzle body, the mating plate pairs extending in an arc of less than 180 degrees, a portion of overlap existing between the upper and lower plate rows; and
    (b) means for equalizing pressure between the area forward of the seal region and the area aft of the seal region.

9. The fire seal according to claim 8, wherein the mating plate pairs extend in an arc of about 90 degrees.

10. The fire seal according to claim 8, wherein the means for equalizing pressure is formed by an air passage extending around the seal region.

11. The fire seal according to claim 8, wherein a gap exists between the upper plate row and the lower plate row during high temperature use.

12. The fire seal according to claim 8, wherein:
    (a) each lower plate row comprises a nozzle stationwise plate attached to the aft nozzle body; and
    (b) each upper plate row comprises a first stationwise plate attached to the first cowl, a second stationwise plate attached to the second cowl, and a pylon stationwise plate attached to the support pylon.

13. An exhaust fire seal for an aircraft gas turbine propulsion system having a circular aft nozzle body located aft of a gas generator, the aft nozzle body lying near a support pylon and being partially surrounded by first and second outer cowls, the fire seal comprising:

(a) at least one mating plate pair formed between the aft nozzle body and both the support pylon and the first and second cowls, the mating plate pairs each including an upper plate row and a lower plate row, both rows lying in a generally upright and stationwise orientation about the aft nozzle body, the mating plate pairs extending in an arc of less than 180 degrees, a portion of overlap existing between the upper and lower plate rows; and (b) means for equalizing pressure between the area forward of the seal region and the area aft of the seal region;

further comprising first and second endplates lying in a generally radial and longitudinal plane, the first and second endplates being located near the outboard lateral sides of the at least two mating plate pairs and extending between the forward-most and aft-most mating plate pairs; whereby the endplates aid in prohibiting passage of flame.

14. An exhaust fire seal for an aircraft gas turbine propulsion system having a circular aft nozzle body located aft of a gas generator, the aft nozzle body lying near a support pylon and being partially surrounded by first and second outer cowls, the fire seal comprising:

(a) at least one mating plate pair formed between the aft nozzle body and both the support pylon and the first and second cowls, the mating plate pairs each including an upper plate row and a lower plate row, both rows lying in a generally upright and stationwise orientation about the aft nozzle body, the mating plate pairs extending in an arc of less than 180 degrees, a portion of overlap existing between the upper and lower plate rows; and (b) means for equalizing pressure between the area forward of the seal region and the area aft of the seal region; wherein the at least one mating plate pair is at least two mating plate pairs, the first seal further comprising at least two upright endplates, at least one endplate being provided at each lateral end of the mating plate pairs and extending generally between the forward-most mating plate pair and the aft-most mating plate pair; and a seal region existing between the forward-most mating pair, the aft-most mating pair, and the two upright endplates.

15. An exhaust fire seal for an aircraft gas turbine propulsion system having a circular aft nozzle body located aft of a gas generator, the aft nozzle body lying near a support pylon and being partially surrounded by first and second outer cowls, the fire seal comprising:

(a) at least one mating plate pair formed between the aft nozzle body and both the support pylon and the first and second cowls, the mating plate pairs each including an upper plate row and a lower plate row, both rows lying in a generally upright and stationwise orientation about the aft nozzle body, the mating plate pairs extending in an arc of less than 180 degrees, a portion of overlap existing between the upper and lower plate rows; and (b) means for equalizing pressure between the area forward of the seal region and the area aft of the seal region;

wherein the first and second stationwise plates each include a proximal end lying near the support pylon, the proximal end including an opening being closed to flame passage by use of a fire bulb seal.

16. The fire seal according to claim 15, further comprising first and second endplates lying in a generally radial and longitudinal plane, the first and second endplates being located near the outboard lateral sides of the at least two mating plate pairs and extending between the forward-most and aft-most mating plate pairs; whereby the endplates aid in prohibiting passage of flame.

17. The fire seal according to claim 16, wherein the first and second endplates each include at least one protective edge flap extending around an outer surface of a cowl stationwise plate.

* * * * *

UNITED STATES PATENT AND TRADEMARK OFFICE
Certificate

Patent No. 5,910,094                                                Patented: June 8, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Kurt R. Kraft, Seattle, WA; Gary L. Vieth, Bellevue, WA; Peter J. Louden, Bellevue, WA; Scott D. Nowak, Post Falls, ID and Neal G. Rolfes, Wichita, KS.

Signed and Sealed this Tenth Day of August, 1999.

TIMOTHY S. THORPE
*Supervisory Patent Examiner*
Art Unit 3746